Feb. 11, 1964    J. A. KAYSER    3,120,746
PRESSURE EQUALIZING MEANS FOR A DOUBLE
CARDAN JOINT CENTERING DEVICE
Filed Jan. 22, 1962    2 Sheets-Sheet 1

United States Patent Office 3,120,746
Patented Feb. 11, 1964

3,120,746
PRESSURE EQUALIZING MEANS FOR A DOUBLE
CARDAN JOINT CENTERING DEVICE
John A. Kayser, Oregon, Ohio, assignor to Dana
Corporation, Toledo, Ohio, a corporation of
Virginia
Filed Jan. 22, 1962, Ser. No. 167,514
4 Claims. (Cl. 64—21)

This invention relates to double Cardan joints in general and more specifically to an improvement in the centering means of a double Cardan universal joint.

This invention is an improvement in the structure of the double Cardan universal joint disclosed in Patent No. 2,988,904, wherein a joint having the usual H-shaped central member is universally connected to a pair of yoke members having portions extending into the H-shaped member. The inwardly extending portions of the yoke members are joined in pivotal relationship by a ball and socket type arrangement. More particularly, one of the inwardly extending portions has a spherically shaped receiving opening therein while the other portion has a spherically shaped ball disposed within the receiving opening in a pivotal manner.

Sealing means are disposed between the spherical receiving opening and the spherical ball received therein to prevent the escape of lubricant therebetween from within the reservoir portion of the centering device. However under operating conditions, due to the fact that the centering device constantly oscillates and rotates, the ball and socket members act as a pumping mechanism and induce a pressure build up of the lubricant present therebetween at the sealing means location which tends to urge the lubricant to escape past the sealing means. This escape of lubricant necessitates more frequent additions to the supply thereof.

It is, therefore, an object of this invention to provide a means for eliminating the building up of pressure at the sealing means location of a ball and socket type connection.

It is a further object of this invention to provide means to eliminate the tendency of lubricant to leak past the sealing means of a ball and socket assembly.

A yet further object of this invention is to provide such an assembly wherein the original lubricant will last for the life of the service.

It is another object of this invention to provide means for insuring that the pressure within a ball and socket assembly is equalized throughout the assembly.

It is yet another object of this invention to provide means in the form of pressure release openings in the vicinity of the sealing means of a ball and socket type coupling whereby pressure in the vicinity of the sealing means is relieved to the balance of the assembly.

Further and other objects of this invention will become apparent upon a consideration of the following specification taken in conjunction with the drawings wherein.

Figure 1:
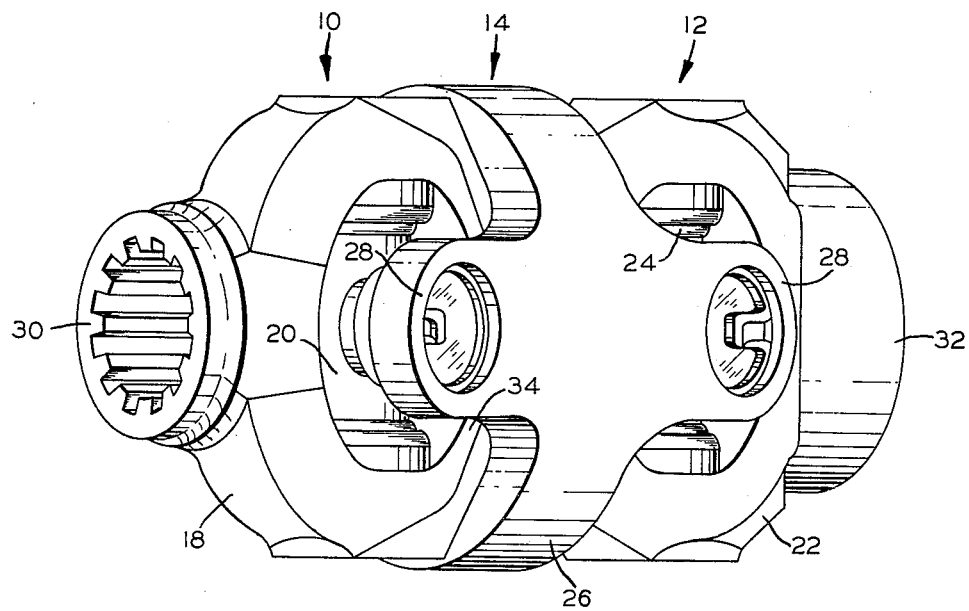
FIG. 1 is a perspective view of a double Cardan universal joint embodying this invention.
Figure 2:
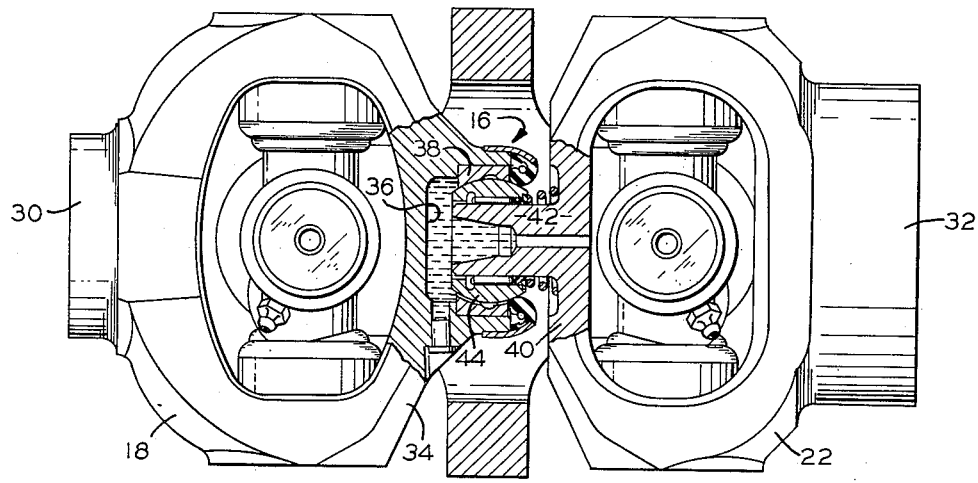
FIG. 2 is an elevational view showing the joint structure of FIG. 1 with parts thereof in section.

Referring more particularly to the drawings, a pair of universal joint assemblies 10 and 12 are operably connected by an intermediate motion or torque transmitting H-shaped member 14, and a centering assembly 16 for relatively positioning corresponding members of the assemblies with respect to each other. The centering assembly 16 co-operates with corresponding members of the two joint assemblies and causes these members to always assume the same angular position relative to an oscillation center of the centering assembly when a flexing of the universal joint structure takes place.

The universal joint assembly 10 comprises a yoke 18 and a cross 20. The universal joint assembly 12 comprises similar yoke and cross members 22 and 24. Each of these yokes 18 and 22 has spaced arms carrying suitable bearings which receive oppositely extending trunnions of the crosses 20 and 24 respectively.

The intermediate motion transmitting H-shaped member 14 takes the form of an annulus 26 having two pairs of ears 28 extending in opposite directions axially of the structure and spaced 180° apart on the annulus. Suitable bearings are provided in the ears 28 for receiving a second pair of oppositely extending trunnions of each cross 20 and 24. The second pair of oppositely extending trunnions is disposed at right angles to the axis of the trunnions received in the yokes 18 and 22. From the arrangement which is illustrated in the drawings and which has just been described, it is apparent that the intermediate motion transmitting member 14 is a double yoke member common to and connecting the joint assemblies 10 and 12. Moreover, from the foregoing it is understood that the crosses 20 and 24 are trunnioned or swivelled in the yokes 18 and 22 and connect the same with the intermediate motion transmitting number 14.

The yoke 18 of the joint assembly 10 is provided with a splined sleeve extension 30 for connection with a power shaft such as a shaft of a motor vehicle transmission. The yoke 22 of joint assembly 12 may also be provided with a sleeve extension 32 for connection with a power shaft, such as a propeller shaft or axle shaft of a motor vehicle. The unitary yoke and splined sleeve construction for connecting the joint assemblies to respective power shafts is merely illustrative. Other constructions, such as a two piece yoke having bolted connecting means, may also be used.

Figure 3:
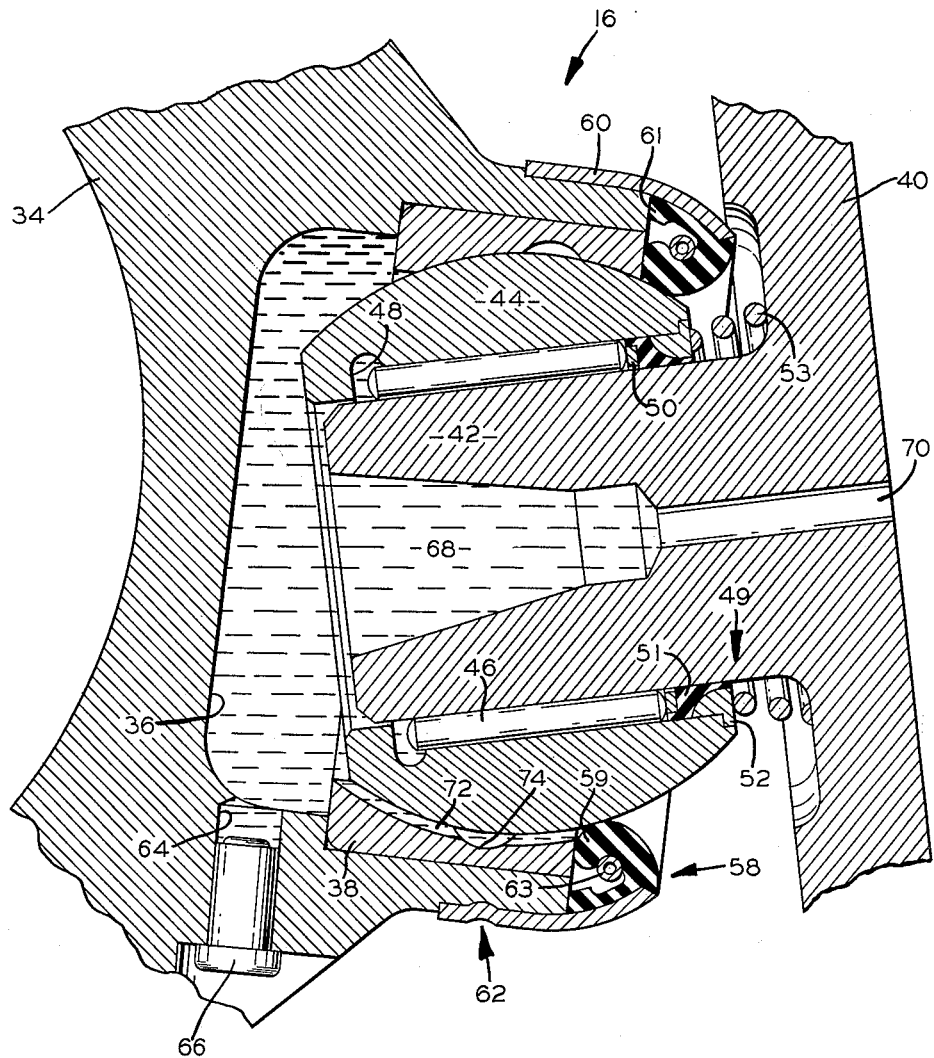
FIG. 3 is an enlarged sectional view of the centering assembly illustrated in FIG. 2.

To provide the joint assemblies 10 and 12 with the centering assembly or positioning means 16, a bridge extension or web 34 integrally connects the arms of yoke 18. As best shown in FIG. 3 the medial portion of the web 34 is enlarged and provided with a lubricant reservoir which takes the form of a recess 36 having an opening at one end thereof. An annular insert or socket member 38 is fitted into the wall of reservoir 36 adjacent the open end thereof and protrudes radially slightly into the reservoir.

Another bridge extension or web 40 integrally connects the arms of yoke 22. The medial portion of web 40 has a cylindrical stem 42 extending outwardly therefrom and into the socket opening of the reservoir 36. A spherical ball element 44, having the ends thereof truncated, is rotatable and axially slidable on the cylindrical stem 42. Interposed between the ball element 44 and the stem 42 are a plurality of needle bearings 46 which facilitate relative movement of the ball and stem. The ball element 44 is counter bored to accommodate the bearings 46 and an annular shoulder 48 is formed therein to limit axial movement of the bearings in one direction. An annular sealing and biasing means, shown generally at 49 is disposed about the stem 42 and engages the web 40 and the ball element 44. More particularly, an annular ring 50 is disposed in the end of the ball member 44 opposite the shoulder 48 to abut the needle bearings 46 and limit the outward axial movement thereof. The ring 50 is abutted at its outer side by a resilient sealing ring 51, which ring is molded integrally with an annular abutment ring 52. The sealing ring 51 abuttingly engages the stem 42 and the central opening of the ball element 44 and prevents the escape of lubricant therebetween. The annular abutment ring 52 engages the outer truncated end of the ball 44 and urges the same into the socket 38 in response to the bias of an annular compressive spring 53 which spring is compressed between the abutment ring 52 and the web 40.

Means is also provided to seal external leakage and prevent entry of foreign matter between the ball member 44 and the socket 38. More particularly, an annular resilient member shown generally at 58 having a substantially U-shaped cross section is secured about the socket opening in reservoir 36 by a cup 60 which is, in turn, held in place by a portion thereof shown generally at 62 being deformed into the outer diameter of the reservoir 36. The resilient member 58 has a portion 59 thereof sealingly engaging the end of socket insert 38 and the outer surface of ball member 44 and a second portion 61 sealingly engaging the outer end of the reservoir 36. An annular tension garter spring 63 is contained within the member 58 and urges the same into engagement with the socket and ball members 38 and 44.

For supplying lubricant to the sliding or bearing parts of the centering assembly 16, a lubricant supply passage 64 is provided in the web 34. An externally accessible supply fitting 66 is disposed in one end of passage 64 and the other end of passage 64 communicates with reservoir 36. To facilitate lubrication of the centering assembly 16 a tapered relief passage 68 is provided in stem 42. This passage communicates with the lubricant reservoir 36 at the outer end of stem 42 and with a duct 70 in web 40 of yoke 22 at the base of stem 42. Duct 70 extends completely through web 40 and communicates with the atmosphere. The relief passage 68 and duct 70 permit the escape of air from the reservoir 36 as lubricant is forced thereinto, and further the appearance of lubricant at the outer end of duct 70 will indicate to the operator that the centering assembly 16 has received sufficient lubricant.

However, as well known in the art, the reservoir may be filled with lubricant upon assembly and sealed for life, thus omitting the lubricant supply passage 64 and the relief means, passage 68 and duct 70.

From the foregoing it is apparent that lubricant is supplied to all the sliding or bearing parts and sealed from external leakage. However, due to the constant oscillation of the ball 44 on stem 42 and rotation of the ball 44 relative to the socket 38, a pumping action is established which results in a build up of lubricant pressure at the location of the seal 58 which pressure urges lubricant past the seal thereby reducing the effectiveness of the same.

Means are provided to relieve this pressure and insure that the pressure at the seal location and within the reservoir 36 is equal. More particularly, a plurality of axially extending passage means in the form of grooves, one of which is shown at 72 are provided on the inner spherical surface of the socket 38.

By means of the grooves 72 the seal 58 and the reservoir 36 are substantially constantly connected so that the pressure level therebetween is effectively equalized and no build up of pressure is present at the seal 58 to force lubricant past the same.

An annular groove 74 extends circumferentially on the inner surface of the socket 38 insuring that lubricant is conducted to all sides of the ball and socket connection. Further, this groove serves as a reservoir to maintain a supply of lubricant in the medial part of the socket; and further, insures that the pressure may be relieved by any of the plurality of grooves 38 in the event some of the plurality become plugged.

From the foregoing it is apparent that a ball and socket assembly has been provided wherein the tendency for lubricant to leak past the sealing means thereof has been eliminated; wherein means have been provided for insuring that the pressure therein is equalized throughout the assembly; and wherein means are provided in the form of pressure release openings in the vicinity of the sealing means whereby the build up of pressure is relieved to the balance of the assembly.

While only a single embodiment of this invention has been shown and described, it is apparent that there may be many changes in structure and operation without departing from the scope of this invention as defined by the appended claims.

What is claimed is:

1. A universal joint assembly comprising, a pair of connected universal joints, centering means for said joint comprising, co-operating members one having a socket means and the other having a stem extending into said socket means, a ball member rotatably and axially movable on said stem and engaging said socket means, means defining a reservoir inwardly from the engagement of said ball member and socket means, a seal abutting said socket means and said ball member outwardly from said reservoir to prevent the escape of lubricant therefrom, said socket means having a groove on the inner surface thereof extending from the area of said seal to the opposite side of the engagement between said socket means and said ball member, whereby the pressure in the area of said seal and the pressure in the reservoir are maintained substantially equal.

2. A universal joint assembly comprising, a pair of connected universal joints, centering means for said joint comprising cooperating members one having a socket element and the other having a ball element extending into said socket element and slidingly engaging the same, means defining a reservoir inwardly from the engagement of said ball element and socket element, a seal abutting said socket element and said ball element axially outwardly from said reservoir to prevent the escape of lubricant therefrom, said socket element having an axially extending opening joining the area of said seal to said reservoir, and one of said elements having a circumferentially extending opening confluent with said axially extending opening and positioned in the area of the engagement between said elements, whereby the pressure in the area of said seal and the reservoir in said socket means is maintained substantially equal.

3. A universal joint assembly comprising, a pair of connected universal joints, centering means for said joint comprising cooperating members one having a socket element and the other having a stem extending into said socket element, a ball element rotatably and axially movable on said stem and engaging said socket element, means defining a reservoir inwardly from the engagement of said ball element and socket element, a seal abutting said socket element and said ball element outwardly from said reservoir to prevent the escape of lubricant therefrom, said socket means having a groove on the inner surface thereof extending from the area of said seal to the opposite side of the engagement between said socket element and said ball element, and one of said elements having a circumferentially extending opening confluent with said groove and lying in the area of the engagement of said ball and socket elements whereby the pressure in the area of said seal and the pressure in the reservoir are maintained substantially equal.

4. A universal joint assembly comprising, a pair of connected universal joints, centering means for said joint comprising cooperating members one having a socket means and the other having a stem extending axially into said socket means, a ball member rotatably and axially movable on said stem and engaging said socket means, means defining a reservoir inwardly from the engagement of said ball member and socket means, a seal abutting said socket means and said ball member outwardly from said reservoir to prevent the escape of lubricant therefrom, said socket means having a plurality of axially extending grooves on the inner surface thereof extending from the area of said seal to the opposite side of the engagement between said socket means and said ball member, and said socket means having a circumferentially extending groove on the inner surface thereof in the area of the engagement between said socket means and said ball member and confluent with said axial grooves, whereby the pressure in the area of said seal and the pressure in the reservoir are maintained substantially equal.

References Cited in the file of this patent

UNITED STATES PATENTS

| | | |
|---|---|---|
| 2,421,691 | Gibson et al. | June 3, 1947 |
| 2,947,158 | King | Aug. 2, 1960 |
| 2,988,904 | Mazziotti | June 20, 1961 |
| 2,991,634 | Dalcy | July 11, 1961 |